US010733795B2

(12) United States Patent
Drehfal et al.

(10) Patent No.: US 10,733,795 B2
(45) Date of Patent: Aug. 4, 2020

(54) SYSTEM AND METHOD FOR RIM SHAPE DETERMINATION

(71) Applicant: Trek Bicycle Corporation, Waterloo, WI (US)

(72) Inventors: Claude Drehfal, Madison, WI (US); Mio Suzuki, Fitchburg, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 24 days.

(21) Appl. No.: 16/243,311

(22) Filed: Jan. 9, 2019

(65) Prior Publication Data

US 2019/0213785 A1    Jul. 11, 2019

Related U.S. Application Data

(60) Provisional application No. 62/615,620, filed on Jan. 10, 2018.

(51) Int. Cl.
| | | |
|---|---|---|
| *G06T 17/00* | (2006.01) | |
| *B60B 21/00* | (2006.01) | |
| *G06F 30/17* | (2020.01) | |
| *G06F 30/20* | (2020.01) | |
| *B60B 21/02* | (2006.01) | |
| *G06F 111/06* | (2020.01) | |

(52) U.S. Cl.
CPC .............. *G06T 17/00* (2013.01); *B60B 21/00* (2013.01); *G06F 30/17* (2020.01); *G06F 30/20* (2020.01); *B60B 21/02* (2013.01); *G06F 2111/06* (2020.01); *G06T 2210/24* (2013.01)

(58) Field of Classification Search
CPC ..... G06T 17/00; G06T 2210/24; G06F 30/20; G06F 30/17; G06F 2111/06; B60B 21/00; B60B 21/02
See application file for complete search history.

(56) References Cited

U.S. PATENT DOCUMENTS

| | | | |
|---|---|---|---|
| 2013/0026815 A1 | 1/2013 | Smart | |
| 2015/0346051 A1* | 12/2015 | Magee | G01L 5/133 73/147 |
| 2017/0008337 A1* | 1/2017 | Hed | B60B 21/02 |
| 2018/0037275 A1* | 2/2018 | Magee | B60B 1/041 |

FOREIGN PATENT DOCUMENTS

CN           107145663           9/2017

* cited by examiner

*Primary Examiner* — Maurice L. McDowell, Jr.
(74) *Attorney, Agent, or Firm* — Bell & Manning, LLC; Christopher Kalafut

(57) ABSTRACT

A system for determining rim shape includes a memory and a processor in communication with the memory. The processor is configured to receive one or more specifications for a rim. The processor is also configured to determine a rim depth for the rim based at least in part on the one or more specifications and a pareto front of rim shapes. The processor is also configured to determine a curvature control ratio and an endpoint tangency angle for the rim based at least in part on the rim depth. The processor is further configured to generate a rim shape for the rim based at least in part on the rim depth, the curvature control ratio, and the endpoint tangency angle.

20 Claims, 16 Drawing Sheets

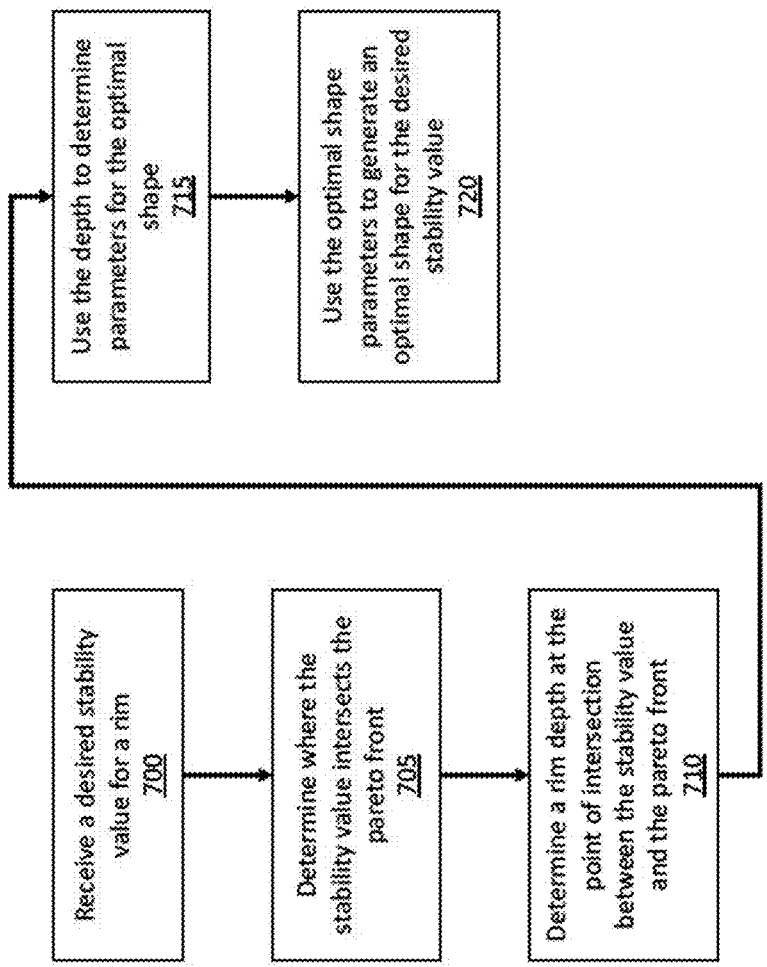

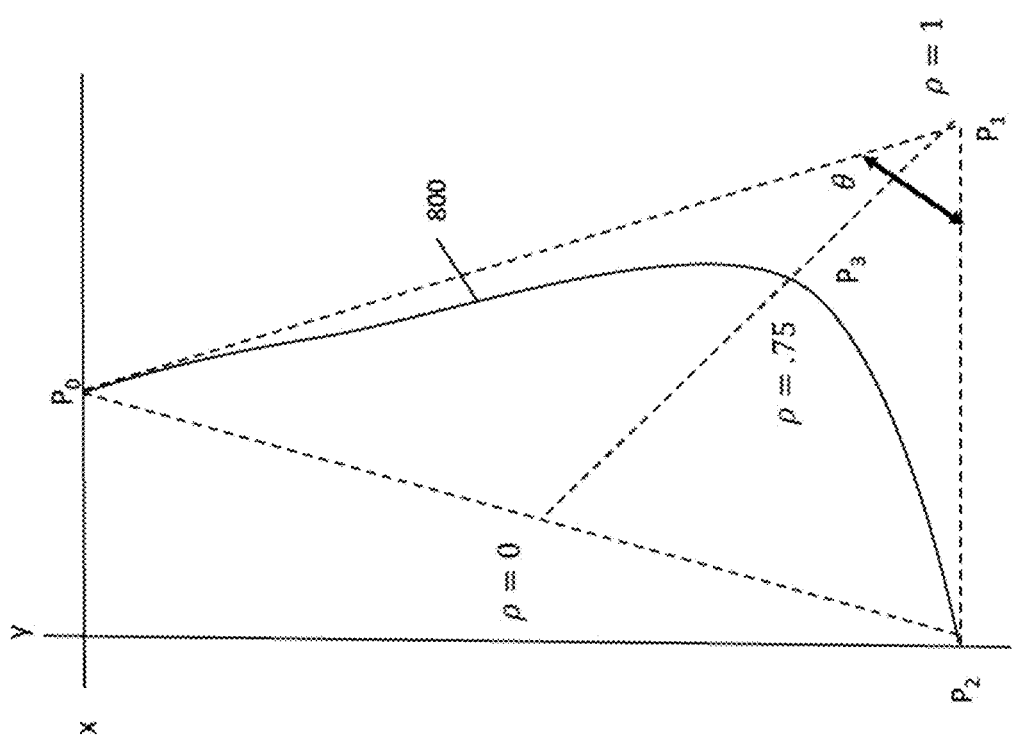

| DEPTH | RHO NOMINAL | RHO MIN | RHO MAX | THETA | THETA NOMINAL | THETA MIN | THETA MAX | WIDTH NOMINAL | WIDTH MIN | WIDTH MAX |
|---|---|---|---|---|---|---|---|---|---|---|
| 40 | 0.4058 | 0.3858 | 0.4258 | | -0.336 | -0.836 | 0.164 | 13.65 | 13.15 | 14.15 |
| 47 | 0.3631 | 0.3431 | 0.3831 | 1.71 | 1.7101 | 1.2101 | 2.2101 | 13.65 | 13.15 | 14.15 |
| 50 | 0.3448 | 0.3248 | 0.3648 | | 2.587 | 2.087 | 3.087 | 13.65 | 13.15 | 14.15 |
| 55 | 0.3143 | 0.2943 | 0.3343 | | 4.0485 | 3.5485 | 4.5485 | 13.65 | 13.15 | 14.15 |
| 60 | 0.2838 | 0.2638 | 0.3038 | 5.51 | 5.51 | 5.01 | 6.01 | 13.65 | 13.15 | 14.15 |
| 65 | 0.2533 | 0.2333 | 0.2733 | | 6.9715 | 6.4715 | 7.4715 | 13.65 | 13.15 | 14.15 |
| 70 | 0.2228 | 0.2028 | 0.2428 | | 8.433 | 7.933 | 8.933 | 13.65 | 13.15 | 14.15 |

FIG. 9A

| DEPTH | RHO NOMINAL | RHO MIN | RHO MAX | THETA | THETA NOMINAL | THETA MIN | THETA MAX | WIDTH NOMINAL | WIDTH MIN | WIDTH MAX |
|---|---|---|---|---|---|---|---|---|---|---|
| 40 | 0.2477 | 0.2277 | 0.2677 |  | 13.154 | 12.654 | 13.654 | 13.35 | 12.85 | 13.85 |
| 47 | 0.2932 | 0.2732 | 0.3132 | 9.6 | 9.6001 | 9.1001 | 10.1001 | 13.35 | 12.85 | 13.85 |
| 50 | 0.3127 | 0.2927 | 0.3327 |  | 8.077 | 7.577 | 8.577 | 13.35 | 12.85 | 13.85 |
| 55 | 0.3452 | 0.3252 | 0.3652 |  | 5.5385 | 5.0385 | 6.0385 | 13.35 | 12.85 | 13.85 |
| 60 | 0.3777 | 0.3577 | 0.3977 | 3 | 3 | 2.5 | 3.5 | 13.35 | 12.85 | 13.85 |
| 65 | 0.4102 | 0.3902 | 0.4302 |  | 0.4615 | -0.0385 | 0.9615 | 13.35 | 12.85 | 13.85 |
| 70 | 0.4427 | 0.4227 | 0.4627 |  | -2.077 | -2.577 | -1.577 | 13.35 | 12.85 | 13.85 |

FIG. 9B

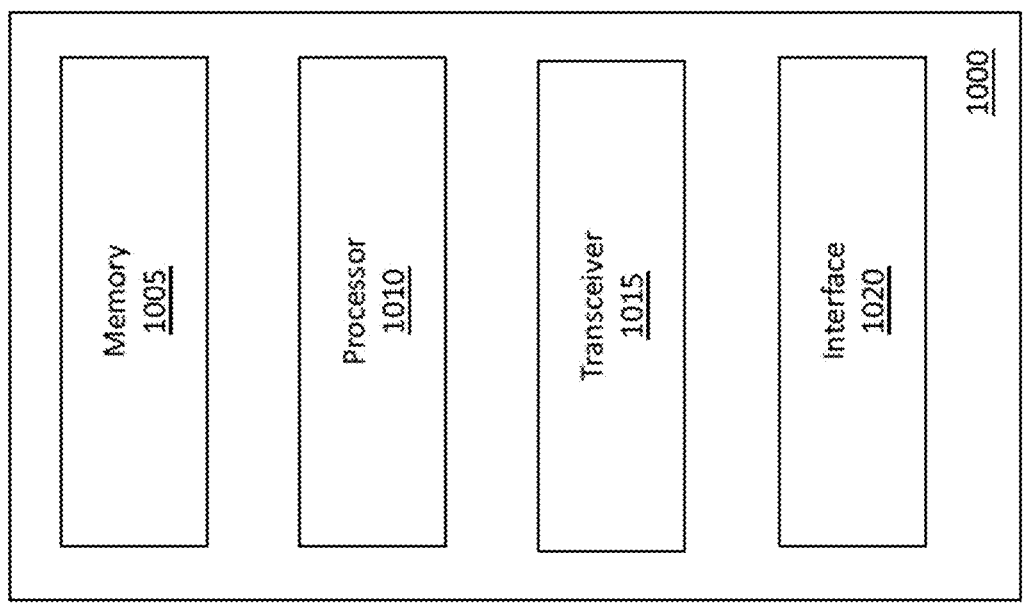

SYSTEM AND METHOD FOR RIM SHAPE DETERMINATION

CROSS-REFERENCE TO RELATED APPLICATION

The present application claims the priority benefit of U.S. Provisional Patent App. No. 62/615,620 filed on Jan. 10, 2018, the entire disclosure of which is incorporated herein by reference.

BACKGROUND

A rim refers to a circular component of a tire system that is used to provide structural support for a tire. The rim typically forms an airtight seal with the tire such that the tire can be inflated with air to a desired firmness. In some implementations, the rim supports an inner tube positioned between the rim and the tire that is configured to be inflated with air. Rims can be used on any type of wheeled vehicles, including bicycles, motorcycles, automobiles, trailers, etc. Typical materials used to construct a rim include carbon, aluminum, steel, stainless steel, plastic, etc.

SUMMARY

An illustrative system for determining rim shape includes a memory and a processor in communication with the memory. The processor is configured to receive one or more specifications for a rim. The processor is also configured to determine a rim depth for the rim based at least in part on the one or more specifications and a pareto front of rim shapes. The processor is also configured to determine a curvature control ratio and an endpoint tangency angle for the rim based at least in part on the rim depth. The processor is further configured to generate a rim shape for the rim based at least in part on the rim depth, the curvature control ratio, and the endpoint tangency angle.

An illustrative method for determining rim shape includes receiving, by a computing system, one or more specifications for a rim. The method also includes determining, by a processor of the computing system, a rim depth for the rim based at least in part on the one or more specifications and a pareto front of rim shapes. The method also includes determining, by the processor, a curvature control ratio and an endpoint tangency angle for the rim based at least in part on the rim depth. The method further includes generating, by the processor, a rim shape for the rim based at least in part on the rim depth, the curvature control ratio, and the endpoint tangency angle.

Other principal features and advantages of the invention will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings, wherein like numerals denote like elements. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 7 is a flow diagram depicting operations performed to determine a rim shape using the rim determination system in accordance with an illustrative embodiment.

FIG. 8 is a diagram depicting a curve that satisfies the $2^{nd}$ degree Bezier curve in accordance with an illustrative embodiment.

FIG. 9A depicts rim shape variables developed by the system over a rim depth range for clincher rims in accordance with an illustrative embodiment.

FIG. 9B depicts rim shape variables developed by the system over a rim depth range for tubular rims in accordance with an illustrative embodiment.

FIG. 10 is a block diagram depicting a computer system in accordance with an illustrative embodiment.

DETAILED DESCRIPTION

Figure 1:
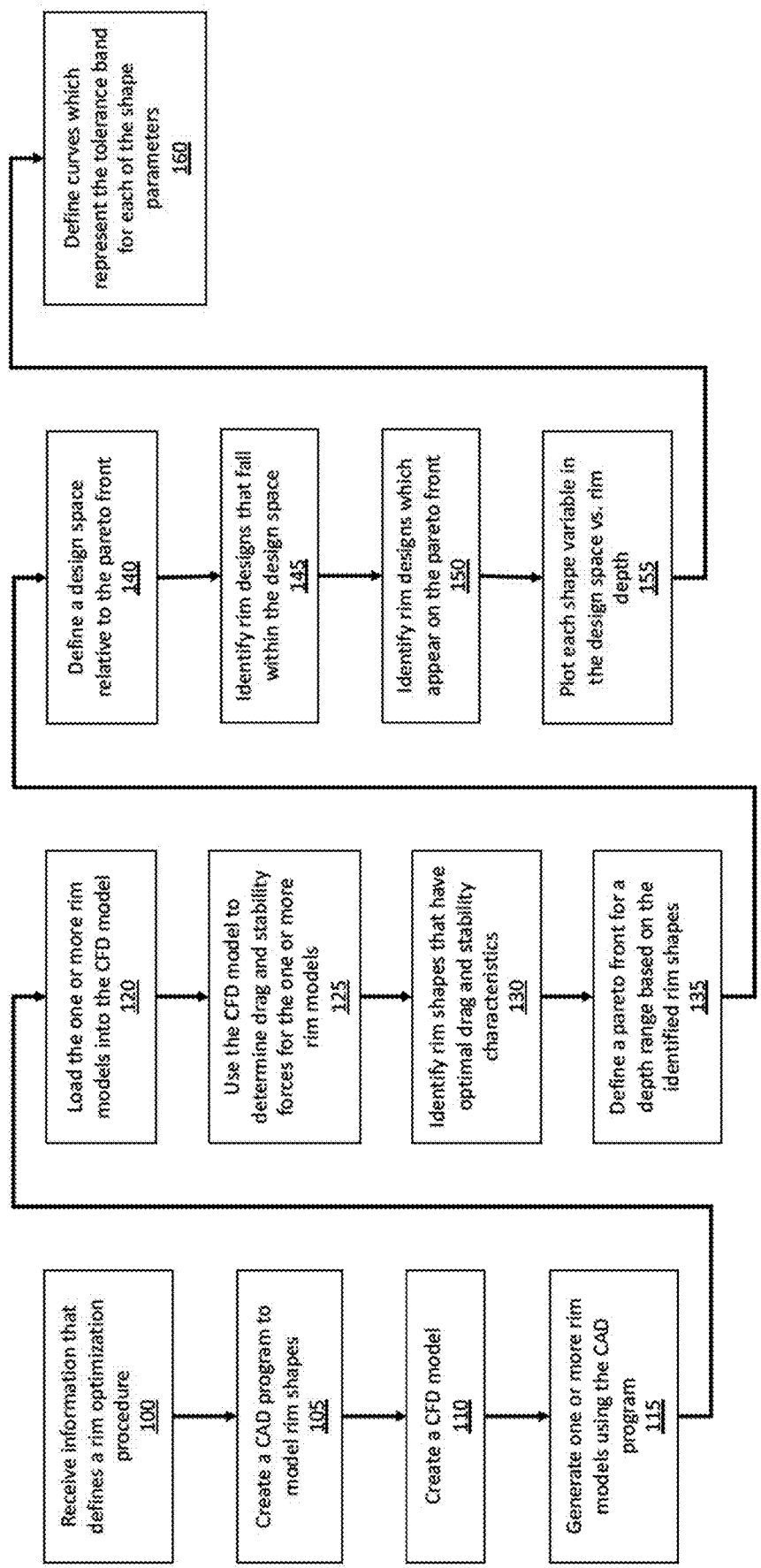
FIG. 1 is a flow diagram depicting operations performed to generate a rim shape determination system in accordance with an illustrative embodiment.

As discussed above, a rim is used to provide structural support for a tire of a wheeled vehicle, such as a bicycle, motorcycle, unicycle, automobile, etc. In some embodiments, a rim can include a hub at its center that is configured to receive an axle such that the rim can be mounted to a vehicle. The axle can be part of a quick release system that is used to secure the hub to the vehicle. In some embodiments, the hub, or central region of the rim, can also include a plurality of through holes such that the rim can be bolted to an axle system of the vehicle. The rim can also include spokes that extend from the hub to an outer portion of the rim that supports the tire. The spokes can be wire spokes or solid spokes, depending on the implementation. Alternatively, the rim may not include spokes. In such an embodiment, the rim can be solid or substantially solid. In the context of a bicycle, a rim can be characterized as a part of a clincher system or a tubular system. In a clincher system, the rim includes an internal ridge that is configured to hold (or clinch) a bead running along the inside of the tire. The interface between the internal ridge of the rim and the bead of the tire is made air tight when an inner tube of the tire is inflated. In a tubular system, an inner tube is embedded in a tire, and the tire is glued or otherwise adhered to the rim.

Rims come in a variety of shapes and types, depending on the type of vehicle for which they are designed, the type of terrain over which the vehicle will travel, desired aesthetics of the vehicle owner, the environmental conditions in which the vehicle will be exposed, etc. As a moving component of a vehicle that is exposed to the external environment in which the vehicle travels, a rim can impact the efficiency with which the vehicle is able to travel. In the context of a bicycle, the shape of the rim can affect the amount of drag on the bicycle and the stability of the bicycle as it is driven. As used herein, drag can refer to the front-to-back air/wind resistance attributable to the rim, and stability can refer primarily to the side-to-side and rotational forces to which the rim is subjected. Small differences in the drag and/or stability of the rim can impact the overall speed and efficiency of the bicycle, which can be very important for racing bicycles. In the context of an automobile, the shape of the rim and its associated drag and/or stability can affect the gas mileage of the vehicle.

Described herein is a method and system for determining a shape of a rim based on desired attributes for the rim. In one embodiment, a user can specify a rim width and/or a rim depth, and the systems and processes described herein can be used to determine a rim shape with the specified dimension(s) that minimizes drag and the side forces which affect stability. In another embodiment, the processes and systems described herein can determine a pareto front of rim shapes that minimize drag and side forces. The pareto front can be used to calculate rim variables for an optimal rim, and rim equations can then be used to determine a shape of the optimal rim using the rim variables. These processes are described in more detail below.

FIG. 1 is a flow diagram depicting operations performed to generate a rim shape determination system in accordance with an illustrative embodiment. In alternative embodiments, fewer, additional, and/or different operations may be performed. Additionally, the use of a flow diagram is not meant to be limiting with respect to the order of operations performed. In an operation 100, the system receives information that defines a rim optimization procedure. The information that defines the rim optimization procedure can include an indication of whether the rim is to be a tubular rim or a clincher rim. The information can also include a tire size, which can be defined in terms of tire diameter or any other tire metric. The received information can also include design parameters associated with the rim and/or tire, such as a desired value or range of values for rim width, rim depth, tire size, endpoint tangency angle, and curvature control ratio. These parameters are described in more detail below. The received information can also include one or more benchmark shapes for the rim such that the system has a general benchmark for the desired rim shape. The received information can also include identification of and/or information regarding a computational fluid dynamics (CFD) analysis to be used for determining drag and/or stability values of rim shapes. The received information can further include optimization parameters.

In an operation 105, a computer-aided design (CAD) program is created to determine and model various rim shapes in accordance with the information received in the operation 100. The CAD program can include an algorithm that uses the design parameters for the rim to generate a Parasolid or other model thereof. The CAD program can also include information regarding features of the rim (e.g., fillets, holes, etc.) and/or the surface/tread of the tire to improve the accuracy of the rim model. As discussed above, the parameters used by the CAD program to generate the rim model can include rim width (w), rim depth (D), tire size (t), an endpoint tangency angle (theta or θ), and/or a curvature control ratio (rho or ρ). With the exception of tire size, these parameters are depicted and described in more detail below with reference to FIG. 2.

Figure 2:
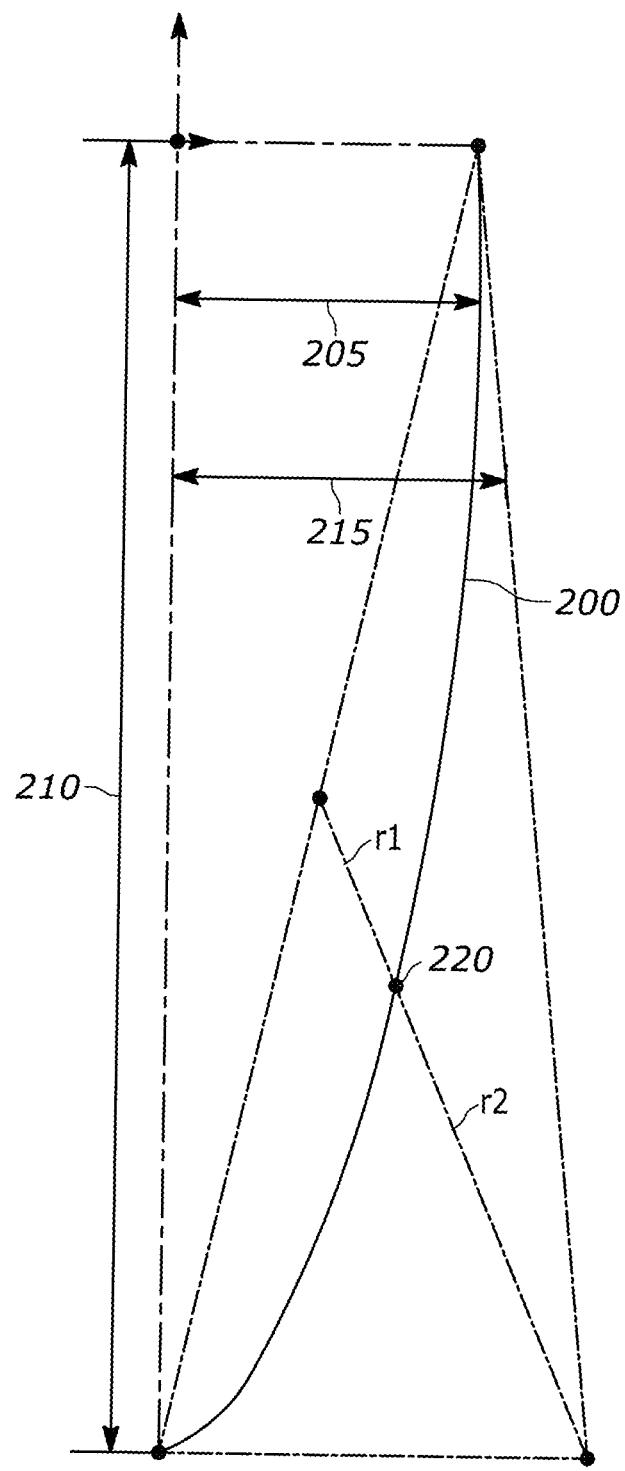
FIG. 2 is a diagram depicting rim variables related to a contour of the rim in accordance with an illustrative embodiment.

FIG. 2 is a diagram depicting rim variables related to a contour of the rim in accordance with an illustrative embodiment. As shown in FIG. 2, a rim contour 200 has a width 205, which refers to a side-to-side distance across the rim. In one embodiment, the width 205 can range from approximately 26 millimeters (mm) to 32 mm. Alternatively, other values may be used, such as 20 mm, 25 mm, 35 mm, 40 mm, etc. A depth 210 (D) of the rim contour 200 refers to a distance from a top of the rim (i.e., where the rim meets the tire) to a nose of the rim (i.e., where the rim meets the spokes, if present). In an illustrative embodiment, the depth 210 can range from 30 mm to 90 mm. Alternatively, other values may be used, such as 20 mm, 95 mm, 100 mm, etc.

As shown in FIG. 2, theta 215 refers to an angle formed between a vertical line that includes a topmost point of the rim contour 200 and a line which is tangent to the topmost point of the rim contour 200. Theta 215 is a critical angle for determining the overall aerodynamic properties of the rim. In an illustrative embodiment, theta can range in value from approximately 0-8 degrees. Alternatively, other angle values may be used for theta, such as 9 degrees, 10 degrees, 12 degrees, etc.

Rho 220 is a curvature control ratio that helps define the curvature of the rim contour 200. In an illustrative embodiment, rho 220 can be defined in terms of the ratio of line r1 to line r2 in FIG. 1. The line which includes r1 and r2 runs from a center point of a line that connects the top and nose of the rim contour 200 to an intersection of the line which is tangent to the topmost point of the rim contour 200 (i.e., the tangent line which defines theta 215) and a line which is tangent to a bottommost point on the nose of the rim contour 200. As the line r1 decreases and the line r2 increases (i.e., as rho 220 approaches the center point of the line that connects the top and nose of the rim contour 200), the value of rho 220 approaches 0. As the line r1 increases and the line r2 decreases (i.e., as rho 220 approaches the intersection of the tangent lines), the value of rho 220 approaches 1. In one embodiment, rho 220 can have a value of 0.28. Alternatively, rho can fall within a range of approximately 0.2-0.4. In other alternative embodiments, different values may be used for rho, such as 0.18, 0.42, 0.16, 0.44, etc.

Referring back to FIG. 1, in an operation 110, a computational fluid dynamics (CFD) model is created. The CFD model is used to determine the drag and side forces (or stability) associated with rim shapes having the above-referenced design parameters. In one embodiment, the CFD model utilizes two-dimensional steady state flow with shear stress transport (SST) physics, such as the k-w SST model. In alternative embodiments, a different CFD model formulation may be used. Parameters of the CFD model, such as sigma and low Reynolds damping factors, are calibrated for the specific application of rim shape determination. Specifically, the parameters for the CFD model are set to calibrate the CFD to reproduce force values observed in wind tunnel tests. In one embodiment, a macro can be used to drive a yaw sweep and data output from the CFD model.

In an operation 115, the system generates one or more rim models using the CAD program. In an illustrative embodiment, the one or more rim models is a large number of rim models that are generated over desirable ranges of the design variables, such as depth, width, endpoint tangency angle, curvature control ratio, etc. The one or more rim models can be generated by the CAD program using any techniques known in the art. In an operation 120, the system loads the one or more rim models into the CFD model. The one or more rim models can be loaded into the CFD model using any techniques known in the art.

In an operation 125, the system uses the CFD model to determine drag and stability forces for the one or more rim models. In an illustrative embodiment, the CFD model determines drag force and stability force values for each of the one or more rim models under a plurality of riding surfaces, riding speeds, environmental conditions, etc. Specifically, the CFD model is configured to reproduce drag and stability force values that have been observed in wind tunnel tests. In an alternative embodiment, any other CFD (or other) process may be used to determine the drag and stability force values.

In an operation 130, the system identifies rim shapes that have optimal drag and stability characteristics. In one embodiment, the system determines a minimum of average drag force and a minimum of average absolute value of side force using the CFD model. The system can identify and utilize trends of how the rim shape variables relate to one another under different conditions for a plurality of different rim shapes to help determine the minimums. Additionally, the minimum of drag force and minimum of absolute value of side force can be determined subject to preset constraints for the variables, such as a desirable range of rim depths.

Figure 3:
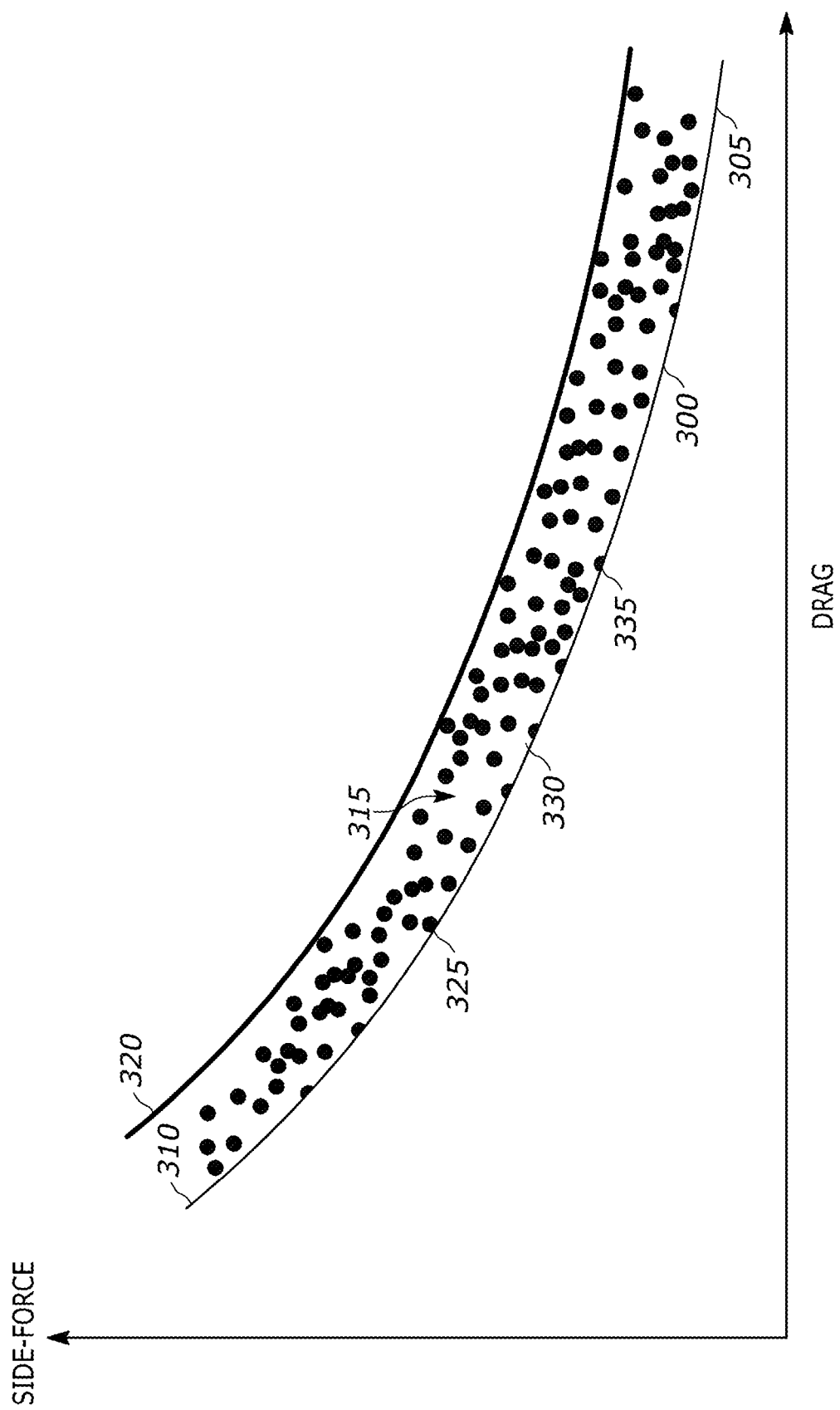
FIG. 3 is a diagram depicting a pareto front in accordance with an illustrative embodiment.

In an operation 135, the system defines a pareto front for a depth range based on the identified rim shapes with optimal drag and stability characteristics. In an operation 140, the system defines a design space relative to the pareto front. In one embodiment, the design space can be defined based on acceptable values of the drag force and side force. In alternative embodiments, the design space can be defined based on any other consideration(s) such as variable tolerances, variable ranges, etc. FIG. 3 is a diagram depicting a pareto front 300 in accordance with an illustrative embodiment. The pareto front 300 is depicted in terms of side force (y-axis) and drag (x-axis), which can be measured in grams or any other units. In the embodiment of FIG. 3, the pareto front 300 is a function of rim depth. In alternative embodiments, the pareto front 300 can be represented as a function of any other of the rim variables described herein. A point 305 on the pareto front 300 represents a minimum depth of interest and a point 310 on the pareto front 300 represents a maximum depth of interest such that the pareto front 300 covers a desired depth range. In one embodiment, the desired depth range can be from 30 mm to 100 mm such that the point 305 corresponds to 30 mm and the point 310 corresponds to 100 mm. Alternatively, a different minimum and/or maximum value may be used.

FIG. 3 also depicts a design space 315 that is formed between the pareto front 300 and a design space boundary 320. The points which appear in the design space 315 correspond to actual rim shapes that have been modeled by the aforementioned CAD program and tested by the CFD model. The design space boundary 320 can be selected on a case-by-case basis depending on acceptable force values for a given rim design. In an alternative embodiment, the design space 315 may include only rim shapes which actually appear on the pareto front 300.

Figure 4:
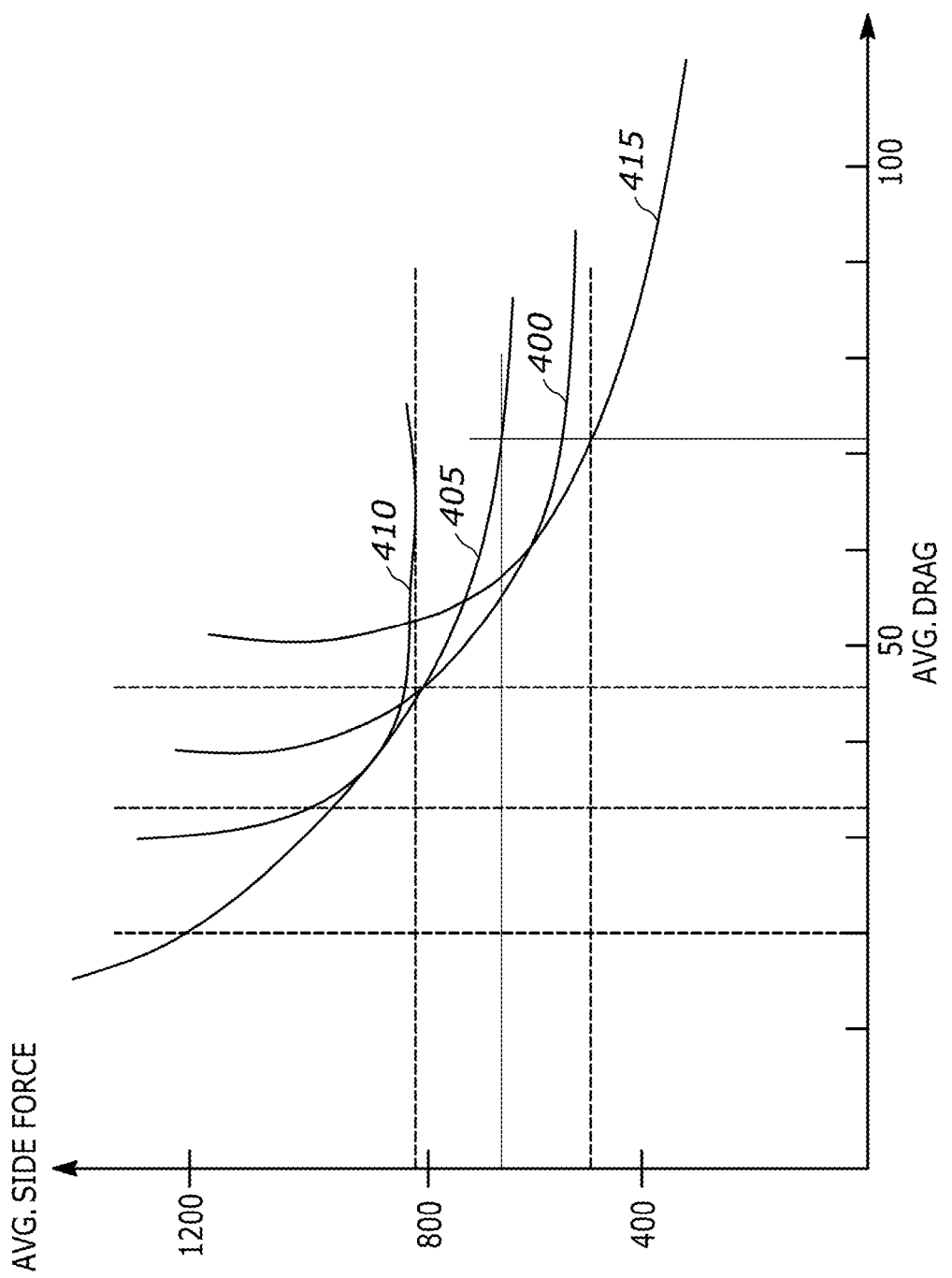
FIG. 4 is a diagram depicting pareto fronts for a plurality of rim depths in accordance with an illustrative embodiment.

FIG. 4 is a diagram depicting pareto fronts for a plurality of rim depths in accordance with an illustrative embodiment. The x-axis of the diagram in FIG. 4 represents average drag and y-axis represents average side force. In an illustrative embodiment, the average drag and average side force can be measured in grams. Alternatively, any other unit may be used. A line 400 is a pareto front for rim designs having a 40 mm depth. A line 405 is a pareto front for rim designs having a 60 mm depth, and a line 410 is a pareto front for rim designs having an 80 mm depth. In alternative embodiments, different depths may be used. Also depicted in FIG. 4 is a pareto front 415 which represents a design space for any rim depth within the range 30 mm-90 mm. As depicted, the pareto front 415 is in contact with at least a portion of each of the lines 400, 405, and 410.

Referring back to FIG. 1, in an operation 145, the system identifies rim designs that fall within the design space. With reference to FIG. 3, the rim designs within the design space are represented by the points depicted between the pareto front 300 and the design space boundary 320. These points can be identified and/or plotted based on the drag/stability characteristics output by the CFD model described above. In an operation 150, the system identifies rim designs which appear on the pareto front. In the context of FIG. 3, rim designs at a point 325, a point 330, a point 335, etc. appear on the pareto front 300.

In an operation 155, the system plots each rim shape variable of the designs in the design space vs. rim depth. These rim shape variables can include rim width, endpoint tangency angle ($\theta$), and curvature control ratio ($\rho$). As discussed in more detail below, these rim shape variables can be used to generate an actual rim shape using rim shape equations. In an alternative embodiment, the system can determine a mathematical relationship between the rim shape variables and rim depth without plotting the variables. In an operation 160, the system defines the curves which represent the tolerance band for each of the shape parameters. The operations 155 and 160 are described in more detail below with reference to FIGS. 5 and 6.

Figure 5A:
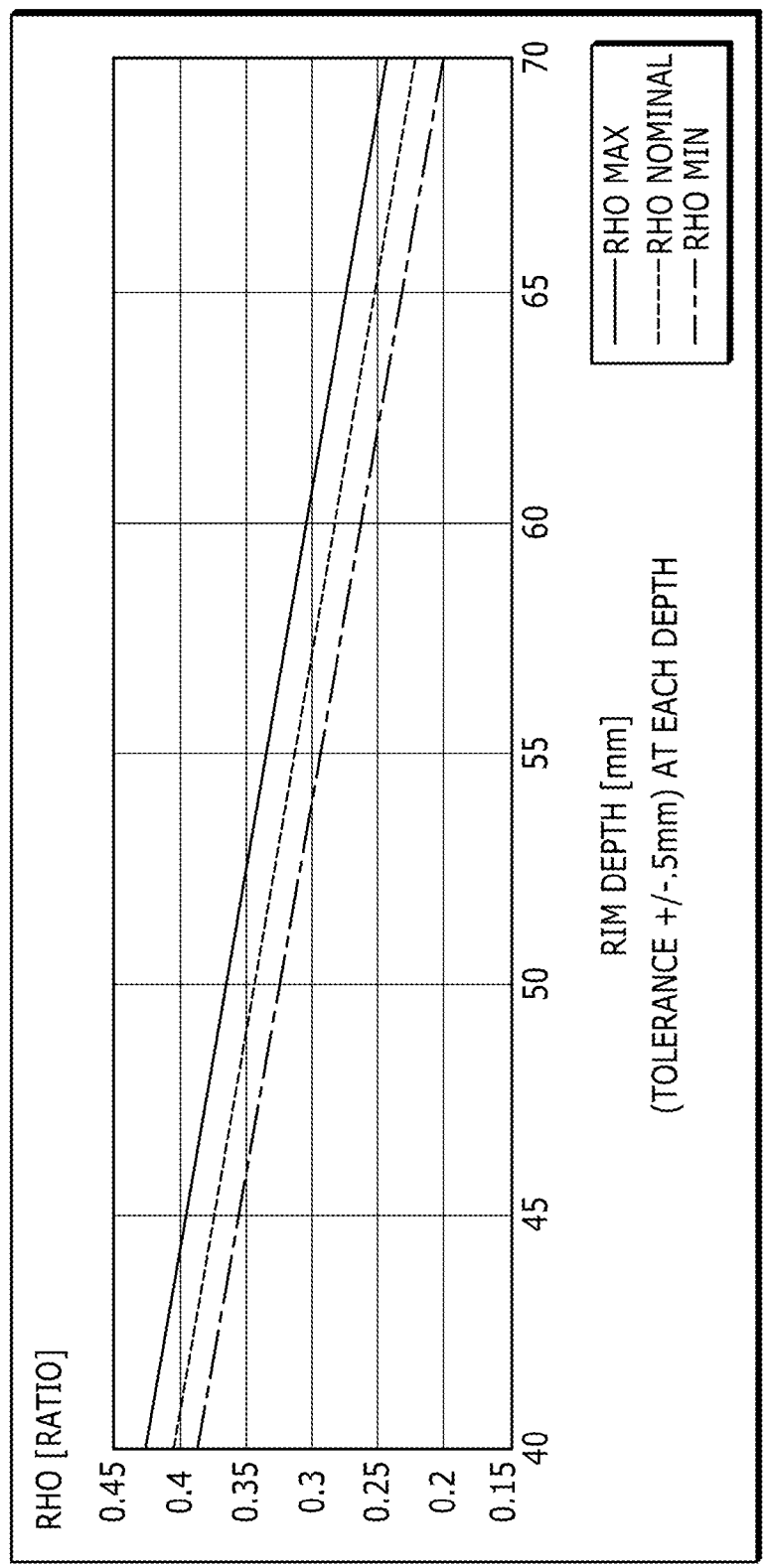
FIG. 5A depicts a plot of the rim shape variable rho versus rim depth for a clincher rim in accordance with an illustrative embodiment.
Figure 5B:
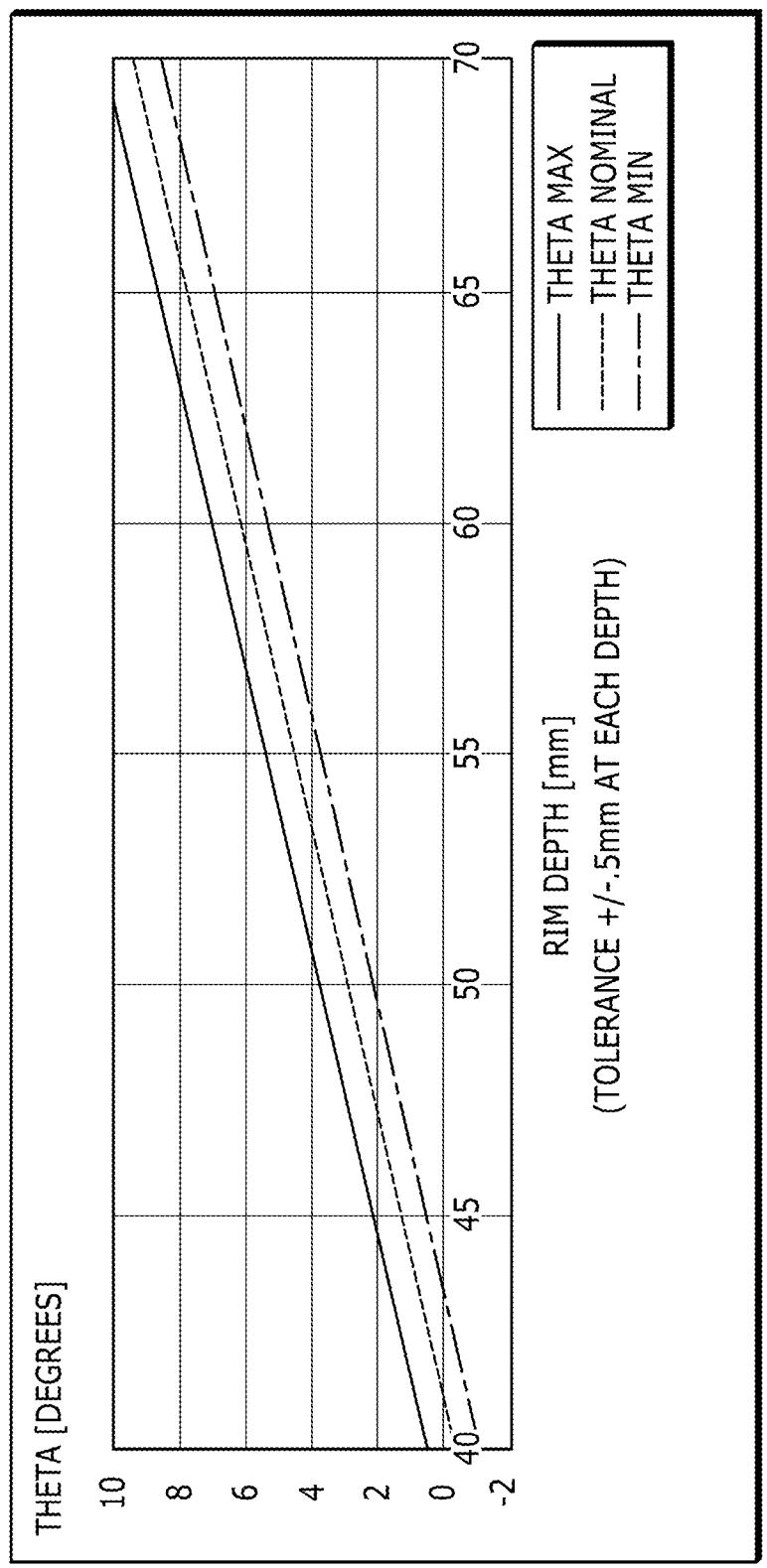
FIG. 5B depicts a plot of the rim shape variable theta versus rim depth for a clincher rim in accordance with an illustrative embodiment.
Figure 5C:
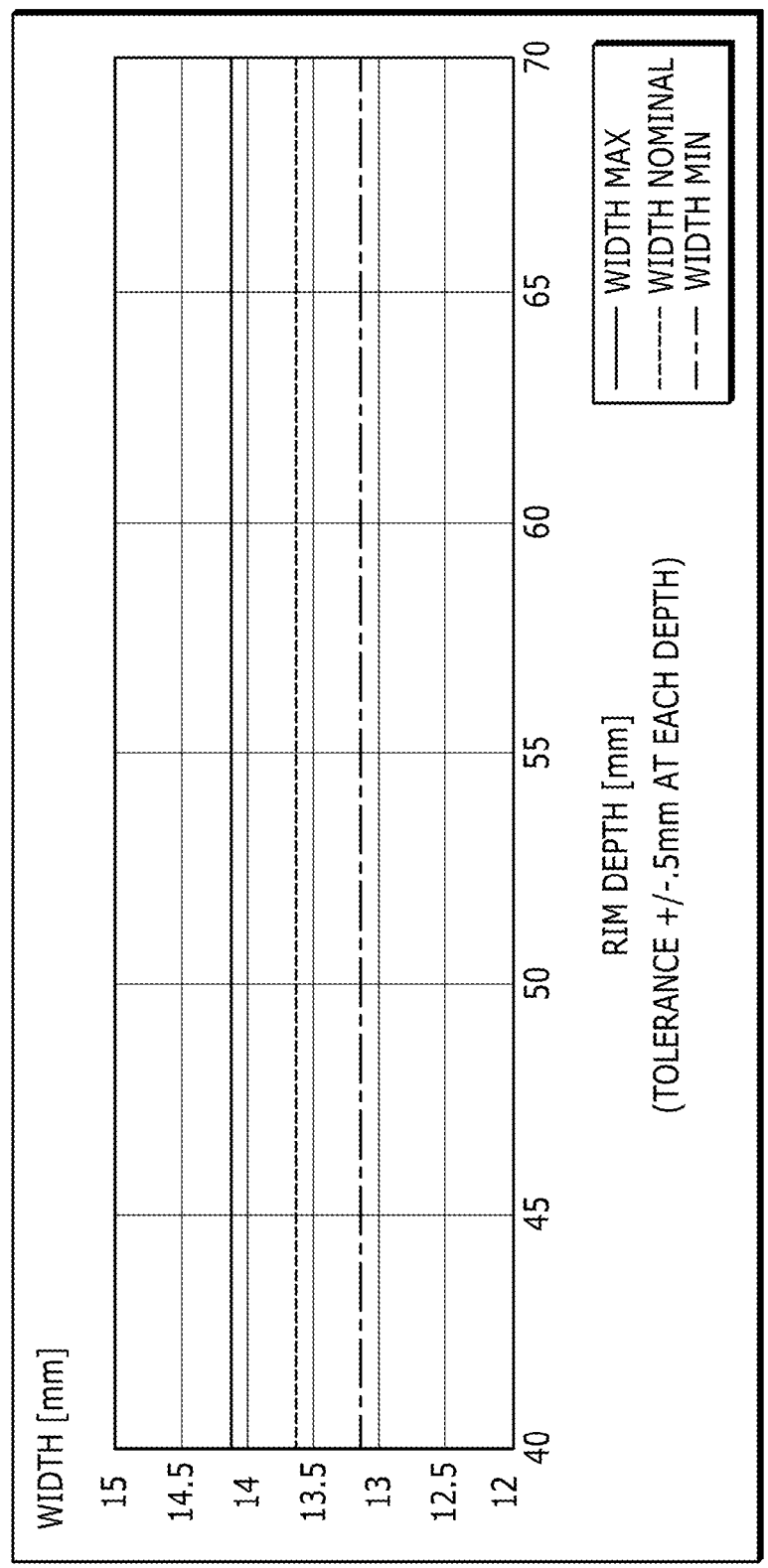
FIG. 5C depicts a plot of the rim width versus rim depth for a clincher rim in accordance with an illustrative embodiment.

FIG. 5A depicts a plot of the rim shape variable rho versus rim depth for a clincher rim in accordance with an illustrative embodiment. FIG. 5B depicts a plot of the rim shape variable theta versus rim depth for a clincher rim in accordance with an illustrative embodiment. FIG. 5C depicts a plot of the rim width versus rim depth for a clincher rim in accordance with an illustrative embodiment. Each of FIGS. 5A-5C depicts a plot of nominal values for the rim shape variable, along with plots of minimum and maximum values for the rim shape variable. In an illustrative embodiment, the plots of nominal values are generated by the system based on clincher rim shapes which were identified as appearing on the pareto front or within a designated design space relative to the pareto front. The minimum and maximum values are based on a tolerance for rim depth, which in the embodiment of FIGS. 5A-5C is +/−0.5 mm. In alternative embodiments, a different tolerance value may be used such as 0.1, 0.3, 0.6, 0.8, etc. As depicted in FIGS. 5A-5C, the rim shape variables are plotted over a depth range of 40 mm-70 mm. Alternatively, a different rim depth range may be used.

Figure 5D:
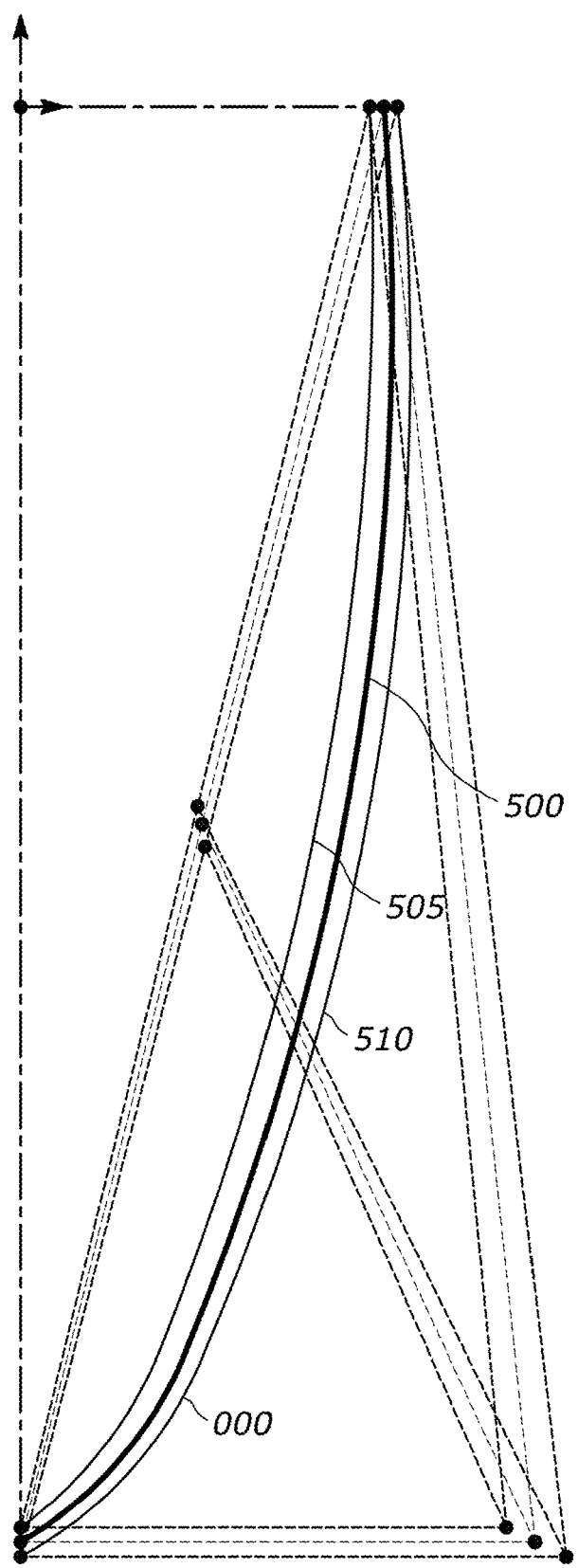
FIG. 5D depicts a plot of rim shapes based on nominal, minimum, and maximum rim shape variable values in accordance with an illustrative embodiment.

FIG. 5D depicts a plot of rim shapes based on nominal, minimum, and maximum rim shape variable values in accordance with an illustrative embodiment. A nominal rim shape 500 is with respect to a clincher rim having a depth of 60 mm. In alternative embodiments, similar plots can be generated for tubular and/or clincher rims at any desired depth. A minimum rim shape 505 is based on minimum values of the rim shape variables (i.e., minimum width, minimum rho, and minimum theta) as depicted in FIGS. 5A-5C. Similarly, a maximum rim shape 510 is based on maximum values of the rim shape variables (i.e., maximum width, maximum rho, and maximum theta) as depicted in FIGS. 5A-5C.

Figure 6A:
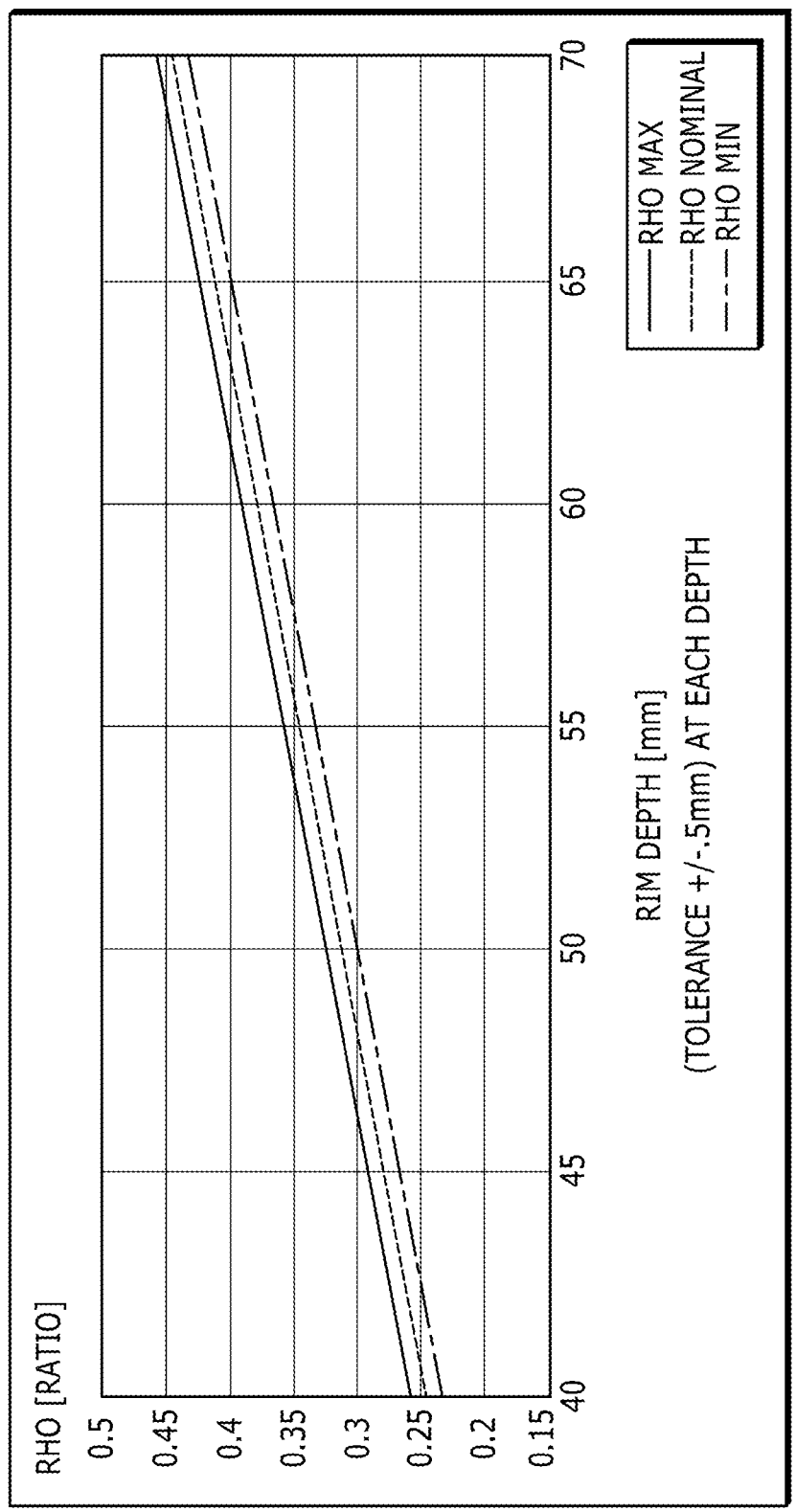
FIG. 6A depicts a plot of the rim shape variable rho versus rim depth for a tubular rim in accordance with an illustrative embodiment.
Figure 6B:
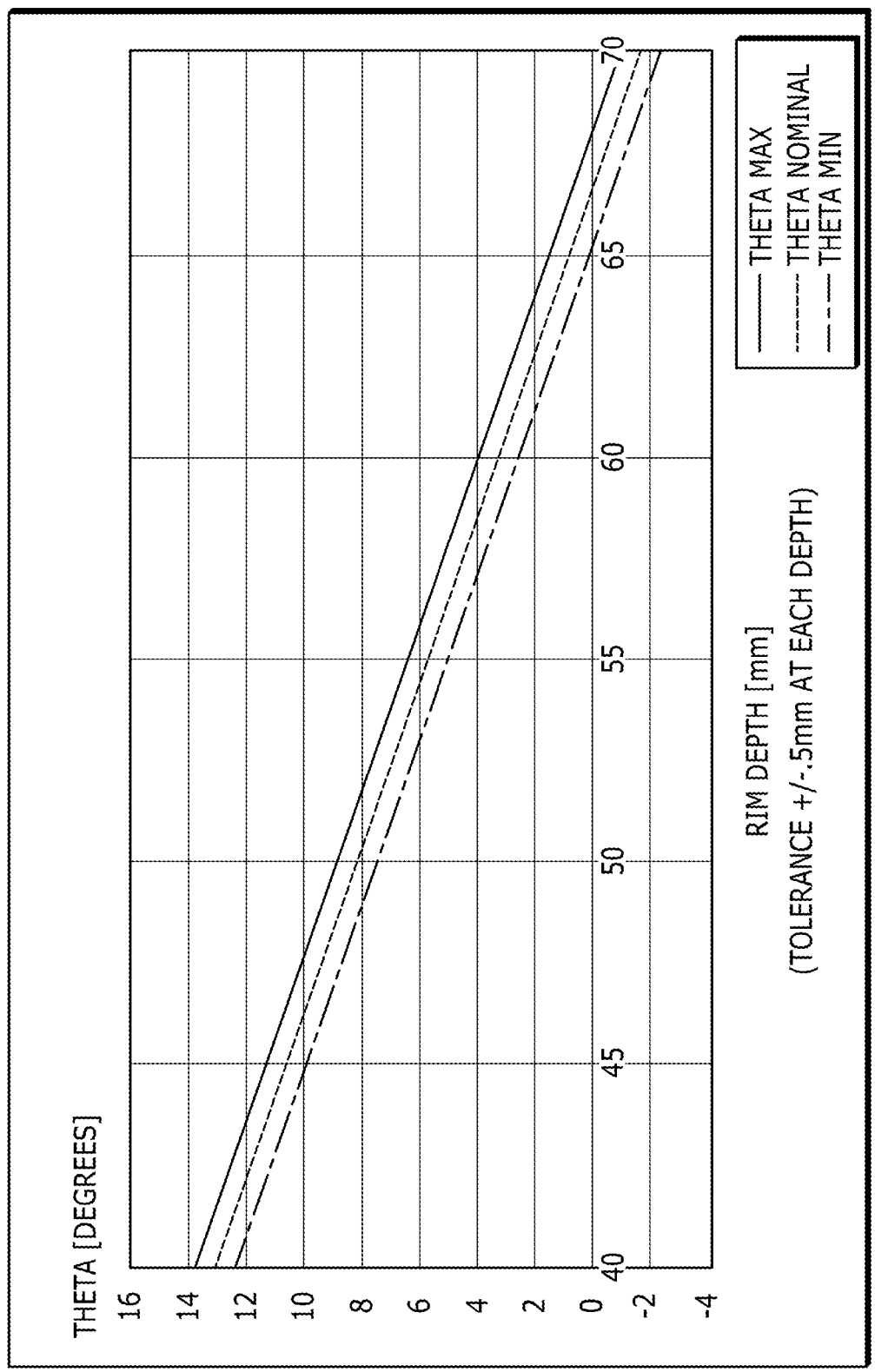
FIG. 6B depicts a plot of the rim shape variable theta versus rim depth for a tubular rim in accordance with an illustrative embodiment.
Figure 6C:
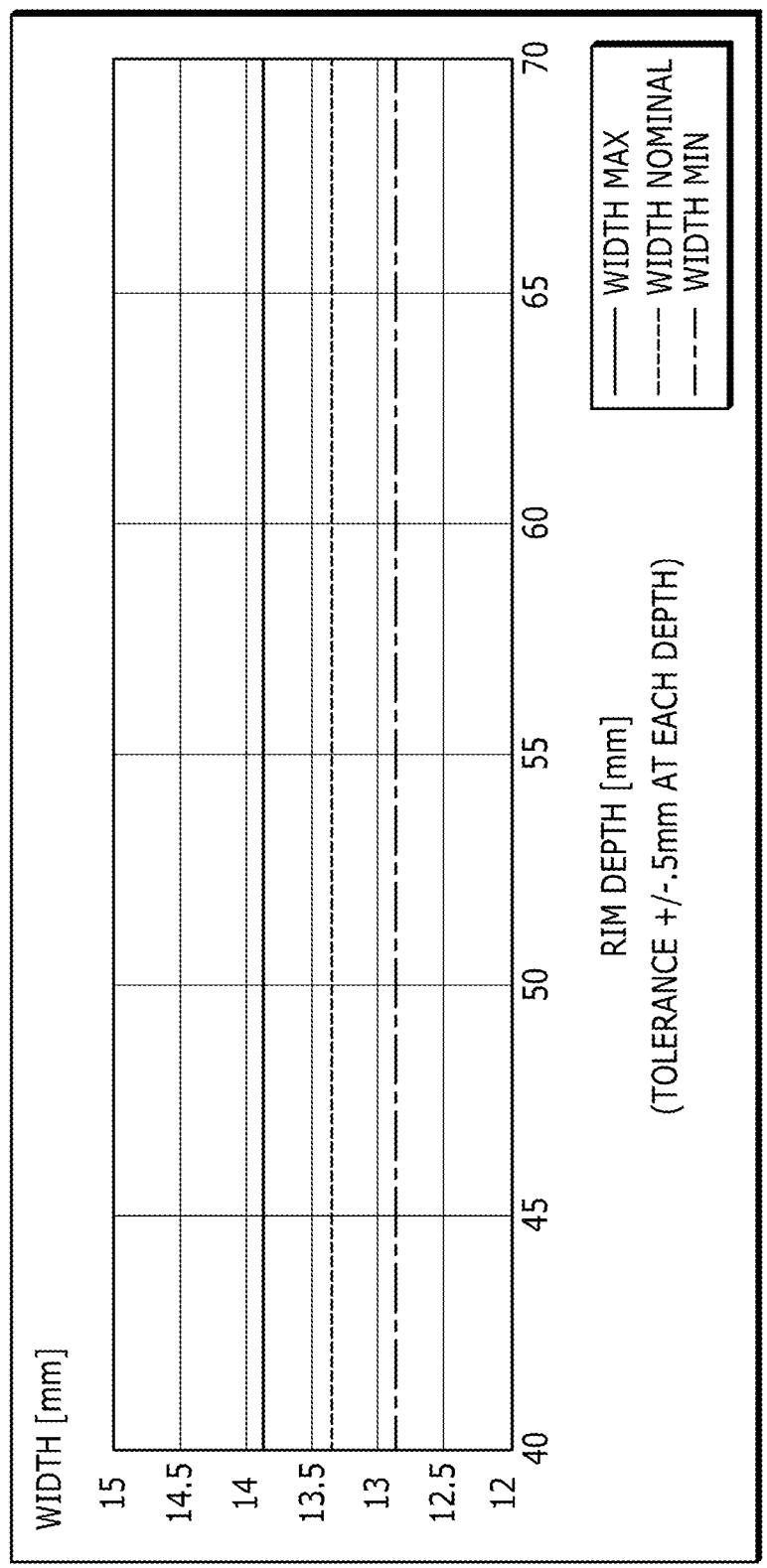
FIG. 6C depicts a plot of the rim width versus rim depth for a tubular rim in accordance with an illustrative embodiment.

FIG. 6A depicts a plot of the rim shape variable rho versus rim depth for a tubular rim in accordance with an illustrative embodiment. FIG. 6B depicts a plot of the rim shape variable theta versus rim depth for a tubular rim in accordance with an illustrative embodiment. FIG. 6C depicts a plot of the rim width versus rim depth for a tubular rim in accordance with an illustrative embodiment. Similar to FIG. 5, each of FIGS. 6A-6C depicts a plot of nominal values for the rim shape variable, along with plots of minimum and maximum values for the rim shape variable. In an illustrative embodiment, the plots of nominal values are generated by the system based on tubular rim shapes which were identified as appearing on the pareto front or within a designated design space relative to the pareto front. The minimum and maximum values are based on a tolerance for rim depth, which in the embodiment of FIGS. 6A-6C is +/−0.5 mm. In alternative embodiments, a different tolerance value may be used. In other alternative embodiments, a different rim depth range may also be used.

With the framework of FIG. 1 in place, the system is able to generate a shape for any depth of rim using the shape parameter values and rim equations. FIG. 7 is a flow diagram depicting operations performed to determine a rim shape using the rim determination system in accordance with an illustrative embodiment. In alternative embodiments, additional, fewer, and/or different operations may be performed. Also, the use of a flow diagram is not meant to be limiting with respect to the order of operations performed. In an operation 700, the system receives a desired stability value for a rim. In an illustrative embodiment, the desired stability value can be a side force value measured in grams, and can be based on desires and characteristics of a rider, the surface over which the rider plans to use the rim, anticipated environmental conditions in which the rim will be used, etc. In an alternative embodiment, the system may instead receive a desired drag value for the rim shape.

In an operation 705, the system determines where the received stability value intersects the pareto front that has been generated by the system. In an operation 710, the system determines a rim depth at the point on the pareto front that intersects the stability value. In an operation 715, the system uses the rim depth and the plots generated in the operations 155 and 160 of FIG. 1 to determine optimal shape parameters for the optimal shape. In an operation 720, the system uses the optimal shape parameters to generate an optimal shape for the desired stability value. In an illustrative embodiment, the optimal shape is generated by using the optimal shape parameters in conjunction with rim shape equations that can be used to convert the parameters into the shape. The rim shape equations are discussed in more detail below.

In an illustrative embodiment, a $2^{nd}$ degree Bezier curve can be used to model rim shape, as follows:

$$f(x,y) = ax^2 + 2bxy + cy^2 + 2dx + 2ey + f = 0 \quad \text{Eq. 1:}$$

As long as the variable f from Equation 1 is not equal to zero, Equation 1 can be divided by f to result in Equation 2, as set forth below. It is noted that in Equation 2, the variables a/f, b/f, c/f, d/f, and e/f are represented by a, b, c, d, and e, respectively.

$$ax^2 + 2bxy + cy^2 + 2dx + 2ey + 1 = 0 \quad \text{Eq. 2:}$$

FIG. 8 is a diagram depicting a curve 800 that satisfies the $2^{nd}$ degree Bezier curve in accordance with an illustrative embodiment. As depicted in FIG. 8, the curve 800 passes through points $P_0$, $P_3$, and $P_2$, and lines tangent to points $P_0$ and $P_2$ intersect at point $P_1$. In an illustrative embodiment, the point $P_0$ can have coordinates $(U_0, V_0)$, the point $P_1$ can have coordinates $(U_1, V_1)$, the point $P_2$ can have coordinates $(U_2, V_2)$, and the point $P_3$ can have coordinates $(U_3, V_3)$, where U refers to a position on the x-axis and V refers to a position on the y-axis. As noted above, the curve 800 passes through point $P_0$ having coordinates $(U_0, V_0)$. As a result, Equation 2 can be rewritten as follows:

$$aU_0^2 + 2bU_0V_0 + cV_0^2 + 2dU_0 + 2eV_0 + 1 = 0 \quad \text{Eq. 3:}$$

Additionally, it can be proved that the tangent line and gradient at point $P_0$ are perpendicular to one another, which results in the following equation:

$$(V_1 - V_0)/(U_1 - U_0) = -(aU_0 + bV_0 + d)(bU_0 + cV_0 + e) \quad \text{Eq. 4:}$$

The curve 800 also passes through point $P_2$ having coordinates $(U_2, V_2)$, which results in Equation 5 below:

$$aU_2^2 + 2bU_2V_2 + cV_2^2 + 2dU_2 + 2eV_2 + 1 = 0 \quad \text{Eq. 5:}$$

As also depicted in FIG. 8, the curve 800 is tangent to line $P_1P_2$ at point $P_2$, which results in:

$$(V_2 - V_1)/(U_2 - U_1) = -(aU_2 + bV_2 + d/(bU_2 + cV_2 + e) \quad \text{Eq. 6:}$$

Lastly, the curve 800 also passes through the point $P_3$ having coordinates (U3, V3), which results in the following equation:

$$aU_3^2 + 2bU_3V_3 + cV_3^2 + 2dU_3 + 2eV_3 + 1 = 0 \quad \text{Eq. 7:}$$

Thus, equations 3-7 are 5 equations with 5 unknowns. The above-discussed rim variables can be introduced into these 5 equations as discussed in more detail below. As depicted in FIGS. 2 and 8, the x-y coordinates of the point $P_0$ are $(U_0, V_0)$ where $U_0$ is equal to the width of the rim (w) and $V_0$ is equal to 0. As a result, Eq. 3 can be rewritten as:

$$aw^2 + 2dw + 1 = 0 \quad \text{Eq. 8:}$$

Again referring to FIGS. 2 and 8, it can be seen that the x-y coordinates of the point P1 are $(U_1, V_1)$, where $U_1$ is equal to w+(D)*(tan θ) and $V_1$ is equal to −D, where D is the rim depth. As a result, Eq. 4 can be rewritten as:

$$1/(\tan θ) = (aw+d)/(bw+e) \quad \text{Eq. 9:}$$

The x-y coordinates of the point $P_2$ are $(U_2, V_2)$, where $U_2$ is equal to 0 and $V_2$ is equal to −D. As a result, Eq. 5 can be rewritten as:

$$cD^2 - 2eD + 1 = 0 \quad \text{Eq. 10:}$$

Similarly, Eq. 6 can be rewritten as:

$$0 = bD - d \quad \text{Eq. 11:}$$

Lastly, with respect to the x-y coordinates of the point $P_3$, it can readily be shown that $U_3$ is equal to w/2+ρ (w/2+D tan θ) and that $V_3$ is equal to −D/2(1−ρ). As a result, Eq. 7 can be rewritten as:

$$a(w/2+\rho(w/2+D\tan θ))^2 + 2b(w/2+\rho(w/2+D\tan θ))(-D/2(1-\rho)) + c(-D/2(1-\rho))^2 + 2d(w/2+\rho(w/2+D\tan θ)) + 2e(-D/2(1-\rho)) + 1 = 0 \quad \text{Eq. 12:}$$

Once the system identifies a rim width (w), rim depth (D), endpoint tangency angle θ, and curvature control ratio ρ, the system can use Equations 8-12 above to determine the values of a-e such that the rim shape can be plotted. It is noted that the actual rim shape is a mirror image of the optimal rim shape curve plotted in accordance with the embodiments described herein. Standard production processes can then be used to fabricate the rim having the optimal rim shape identified by the system. In one embodiment, the optimal rim shape does not account for a lip/ridge along the top edges of the rim such that a tire can be secured thereto. As a result, a radii (or slight curvature) can be placed at the top edges of the optimal rim shape. The radii can be 1.5 mm in one embodiment. Alternatively, a different radii may be used, such as 0.5 mm, 1 mm, 2 mm, 3 mm, etc. Additionally, fabrication of the rim can include the addition of fillets, holes, etc. as known to those of skill in the art.

In an illustrative embodiment, the plots depicted in FIGS. 5A-5C of rim shape variables versus depth for clincher rims and the plots of FIGS. 6A-6C of rim shape variables versus depth for tubular rims can be used to determine linear relationships among the rim shape variables such that determination of the rim shape variables for a given depth is simplified. For example, based on the plots of FIGS. 5A-5C, the following linear equations can be used to determine rho, theta, and rim width once a clincher rim depth is identified (i.e., in the operation 715 of FIG. 7) for depths ranging from 40 mm-70 mm:

$$\text{Rho} = -0.0061(D) + (0.6498 +/- 0.02) \quad \text{Eq. 13:}$$

$$\text{Theta} = 0.2923(D) - (12.03 +/- 0.5) \quad \text{Eq. 14:}$$

$$\text{Rim Width } (w) = 13.65 +/- 0.5 \quad \text{Eq. 15:}$$

Similarly, based on the plots of FIGS. 6A-6C, the following linear equations can be used to determine rho, theta, and rim width once a tubular rim depth is identified for depths ranging from 40 mm-70 mm:

$$\text{Rho} = 0.0065(D) - (0.0123 +/- 0.02) \quad \text{Eq. 16:}$$

$$\text{Theta} = -0.5077(D) + (33.46 +/- 0.5) \quad \text{Eq. 17:}$$

$$\text{Rim Width } (w) = 13.35 +/- 0.5 \quad \text{Eq. 18:}$$

FIG. 9A depicts rim shape variables developed by the system over a rim depth range for clincher rims in accordance with an illustrative embodiment. FIG. 9B depicts rim shape variables developed by the system over a rim depth range for tubular rims in accordance with an illustrative embodiment. Specifically, FIGS. 9A and 9B depict nominal, minimum, and maximum values for rho, theta, and width at various rim depths. The depth range depicted in FIGS. 9A and 9B is 40 mm-70 mm, however other depth ranges may be used in alternative embodiments.

FIG. 10 is a block diagram depicting a computer system 1000 in accordance with an illustrative embodiment. The computer system 1000 can be used to perform any of the operations described herein. The computer system 1000 includes a memory 1005, a processor 1010, a transceiver 1015, and an interface 1020. In alternative embodiments, the computer system 1000 can include fewer, additional, and/or different components.

The memory 1005 can be used to store any algorithms, programs, etc. to implement the operations described herein. The memory 1005 can include one or more computer memories which can be distributed or at a single location, and can be any type(s) of computer memory known in the art. In one embodiment, the memory 1005 can be used to store a CAD program and/or a CFD model as described herein. The memory 1005 can also be used to store computer-readable instructions to implement the operations described herein, rim shape equations, rim shape variables, plots, etc. The processor 1010 can include one or more processors which can be distributed or at a single location, and can be any type(s) of processor known in the art. In an illustrative embodiment, the processor 1010 can be used to execute any programs, models, computer-readable instructions, etc. stored in the memory 1005 or otherwise accessible to the computer system 1000. The processor 1010 can also be used to control the transceiver 1015 and/or to process inputs received through the interface 1020.

The transceiver 1015 can include any type of receiver and any type of transmitter known in the art. The transceiver 1015 can be used to communicate with remote users and/or remote computer systems. The interface 1020 allows a user to interact with the system and input data/requests into the system. The interface 1020 can include a touch screen, a mouse, a keyboard, etc.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system for determining rim shape, comprising:
 a memory; and
 a processor in communication with the memory, wherein the processor is configured to:
  receive one or more specifications for a rim;
  determine a rim depth for the rim based at least in part on the one or more specifications and a pareto front of rim shapes;
  determine a curvature control ratio and an endpoint tangency angle for the rim based at least in part on the rim depth; and
  generate a rim shape for the rim based at least in part on the rim depth, the curvature control ratio, and the endpoint tangency angle.

2. The system of claim 1, wherein the one or more specifications comprises a stability value for the rim.

3. The system of claim 1, wherein the one or more specifications comprises a designation of whether the rim is a tubular rim or a clincher rim.

4. The system of claim 1, wherein the processor is further configured to:
 generate a plurality of rim models;
 determine drag forces and stability forces for each of the plurality of rim models; and
 define the pareto front of rim shapes to include rim shapes that minimize the drag forces and the stability forces.

5. The system of claim 4, wherein the plurality of rim models are generated with a computer-aided design (CAD) program.

6. The system of claim 4, wherein the drag forces and the stability forces are determined with a computational fluid dynamics (CFD) model that includes information from wind tunnel tests.

7. The system of claim 4, wherein the pareto front covers a range of rim depths from a minimum rim depth to a maximum rim depth.

8. The system of claim 1, wherein the processor is further configured to define a design space relative to the pareto front, wherein the rim shape is within the design space.

9. The system of claim 1, wherein to determine the rim depth for the rim, the processor is configured to:
 determine a point on the pareto front that satisfies the one or more specifications for the rim; and
 identify the rim depth associated with the point on the pareto front.

10. The system of claim 1, wherein the processor is configured to generate a first relationship between the curvature control ratio and the rim depth and a second relationship between the endpoint tangency angle and the rim depth.

11. The system of claim 10, wherein the first relationship comprises a plot or an equation.

12. The system of claim 10, wherein the first relationship and the second relationship are generated based at least in part on the pareto front of rim shapes, and wherein the processor is further configured to determine the curvature control ratio and the endpoint tangency angle for the rim based on the first relationship and the second relationship.

13. The system of claim 1, wherein to generate the rim shape, the processor is configured to solve for unknowns in rim shape equations based on at least the rim depth, the curvature control ratio, the endpoint tangency value, and a rim width.

14. A method for determining rim shape, comprising:
 receiving, by a computing system, one or more specifications for a rim;
 determining, by a processor of the computing system, a rim depth for the rim based at least in part on the one or more specifications and a pareto front of rim shapes;
 determining, by the processor, a curvature control ratio and an endpoint tangency angle for the rim based at least in part on the rim depth; and
 generating, by the processor, a rim shape for the rim based at least in part on the rim depth, the curvature control ratio, and the endpoint tangency angle.

15. The method of claim 14, further comprising:
 generating a plurality of rim models;
 determining drag forces and stability forces for each of the plurality of rim models; and
 defining the pareto front of rim shapes to include rim shapes that minimize the drag forces and the stability forces.

16. The method of claim 15, further comprising using a computational fluid dynamics (CFD) model to determine the drag forces and the stability forces, wherein the CFD model includes information from wind tunnel tests.

17. The method of claim 14, wherein determining the rim depth comprises:
 determining a point on the pareto front that satisfies the one or more specifications for the rim; and
 identifying the rim depth associated with the point on the pareto front.

18. The method of claim 14, further comprising generating a relationship between the curvature control ratio and the rim depth, and wherein the curvature control ratio is determined based on the relationship.

19. The method of claim 14, wherein generating the rim shape includes solving for unknowns in rim shape equations based on at least the rim depth, the curvature control ratio, the endpoint tangency value, and a rim width.

20. The method of claim 19, further comprising:
 incorporating the unknowns into a second degree rim shape equation; and
 plotting the second degree rim shape equation to generate the rim shape.

* * * * *